July 12, 1949.  E. A. STALKER  2,476,002

ROTATING WING

Filed Jan. 12, 1946

INVENTOR.
Edward A. Stalker
BY
Marshal o Biebel
ATTORNEY'S

Patented July 12, 1949

2,476,002

UNITED STATES PATENT OFFICE 2,476,002

ROTATING WING

Edward A. Stalker, Bay City, Mich.

Application January 12, 1946, Serial No. 640,865

7 Claims. (Cl. 170—135.4)

This invention relates to aircraft employing a lifting rotor and particularly to the structural design of the rotor wings.

It is a principal object of this invention to provide a wing structure of high strength and low weight having a duct therein for conducting a flow of air for boundary control purposes and in which a large portion of the interior of the wing may be utilized for such duct through which passes the boundary layer control air to thus provide for a large volume of flow with relatively low velocities and thus with reduced energy losses.

It is another object to provide a structure affording a series of openings or slots in the outer portion of the wing spar through which the boundary layer control air can be efficiently jetted.

Other objects will appear from the description and drawings.

I accomplish the above objects by the means illustrated in the accompanying drawings in which—

Figure 2:
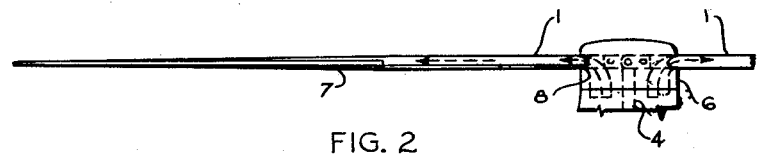
Fig. 2 is a rear elevational view of the wing and hub.

The use of boundary layer control on a rotor wing involves the ducting of a large quantity of air to or from the slot in the wing surface. In order to keep the energy losses at a minimum, the velocity of the ducted air should be as low as possible and this is advantageously accomplished by utilizing a large percentage of the total cross sectional area of the wing.

There is also a difficult problem in providing a slot along the major portion of the span of the wing while maintaining a structure which is both strong and light. In accordance with this invention and after careful stress analysis it has been found that a highly satisfactory construction is provided through the use of an upper chord member supported by vanes on the overhanging leg of a channel forming the lower chord member and that this construction is practical and light.

It is also a feature of this invention that the structure lends itself to the formation of a slot directed to discharge tangentially along the upper surface of a flap. The channel provides a very satisfactory means of housing the nose of the wing flap so that the upper leg is substantially tangent to the flap upper surface, making the slot flow substantially tangent thereto also.

Referring to the drawing which shows a two-bladed rotor employing boundary layer control, the blades or wings 1 are suitably attached to the hub shaft 4 inside the hub dome 6 and have a hinged flap 7. The boundary layer control air is ducted from a compressor unit (not shown) to the duct elbows 8 through which it passes into the blades.

Figure 3:
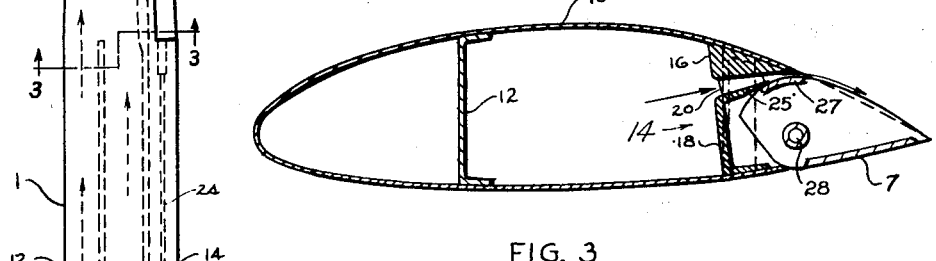
Fig. 3 is a section of the wing along the line 3—3 in Fig. 1.
Figure 1:
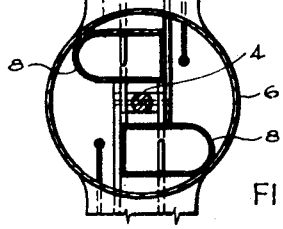
Fig. 1 is a bottom plan view of a rotor wing and hub.

The structural elements of the wing are shown in Fig. 3. The skin 10, preferably formed from a single sheet, is attached to the front spar 12 and the rear spar 14. The skin is sufficiently thick so as to maintain the design contour under load without benefit of ribs and other reinforcing elements. The front spar terminates approximately at the radius at which the flap 2 begins as shown in Fig. 1 while the rear spar runs the entire length of the wing.

Figure 6:
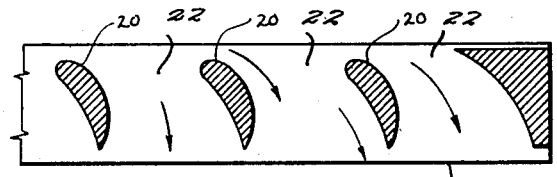
Fig. 6 is a section through the spar along the line 6—6 in Fig. 5.

The front spar and the inner portion of the rear spar are channel-shaped and provide a means of attachment of the wing to the hub shaft 4. The radially outer portion of the rear spar lies just forward of the flap and incorporates a slot 22. This portion of the rear spar is composed of two elements, the upper flange 16 and the bottom channel 18, as shown in the Figs. 4 and 5. These two elements are held in fixed relation by a series of vanes 20 which are integral with the lower channel. The vanes are of airfoil or streamline shape as shown in Fig. 6 and their cross sectional area is large enough to carry the shear loads imposed upon them by the beam action of the rear spar. The nature of the vaned slot 22 thus formed is such that few limitations are placed on its design possibilities. The slot can readily be designed to handle even a relatively large quantity of air with high efficiency by the selection of the proper width and convergence of the slot along with the section and angle of attack of the vanes.

Figures 4, 5:
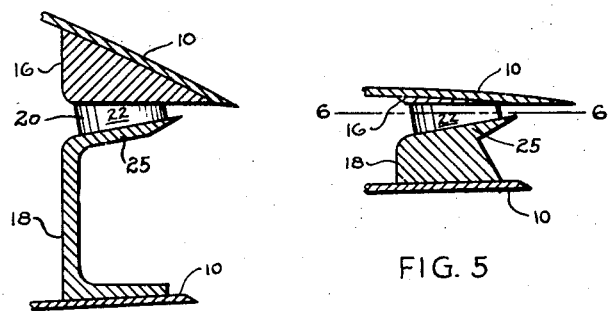
Fig. 4 is a section of the spar along the line 4—4 in Fig. 1.
Fig. 5 is a section of the spar along the line 5—5 in Fig. 1.

In Figs. 3, 4 and 5, the slot has been designed so that the air is turned and jetted from the blade normal to the trailing edge and at the same time tangent to the flap surface for all degrees of flap deflection.

By virtue of the fact that the front spar is discontinued at the point at which the slot begins, the wing has the structural benefit of two spars where the loads are the greatest and at the same time provides a maximum duct area. Referring to Fig. 3, it is seen that all of the wing area except the aft portion to the rear of spar 14 which houses the flap controls 24 is utilized as a duct, thus reducing the velocity of the air and the corresponding duct losses to a minimum.

It is also a feature of this invention that the slot 22 converges downstream of the local flow or outwardly toward its discharge as defined by upper inclined flange 25 of channel 18 so that the turning of the air by the vanes 20 is done in an accelerated flow of air which reduces the tendency to form eddies. It will also be seen from Fig. 3 that the open side of channel 18 receives the nose portion 27 of flap 7 while the upper leg 25 of the channel is substantially tangent to the nose 27 and hence to the upper wall of the flap for at least a major portion of the range of rotation of the flap about its hinge axis 28, thus maintaining the slot flow in such tangential relation and developing the desired conditions for boundary layer control.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination in a helicopter, a lifting rotor wing main body, a flap adjustably supported on said body forming a wing therewith, a rear spar in said body extending spanwise therein and vertically between the upper and lower walls thereof, said spar including a lower member and an upper member spaced therefrom, and spanwise spaced vanes of streamline form between said upper and lower members spacing said members apart and forming therebetween a rearward directed slot adapted to discharge fluid across the upper surface of said flap.

2. In combination in a helicopter, a lifting rotor wing main body, a flap adjustably supported on said body forming a wing therewith, a rear spar in said body extending spanwise therein and vertically between the upper and lower walls thereof, said spar including a lower member and an upper member spaced therefrom, and spanwise spaced vanes of streamline form between said upper and lower members spacing said members apart and forming therebetween a rearward directed slot adapted to discharge fluid across the upper surface of said flap, opposite walls of said slot converging in the downstream direction of the slot flow.

3. In combination in a helicopter, a lifting rotor wing main body, a flap adjustably supported on said body forming a wing therewith, a rear spar in said body extending spanwise therein and vertically between the upper and lower walls thereof, said spar including a lower member and an upper member spaced therefrom, said lower member being in the form of a channel with its legs extending rearward forming a spanwise recess adapted to receive the nose of said flap therein, and structural means joining said upper and lower members and spacing them apart to form therebetween a rearward directed slot adapted to discharge fluid across the upper surface of said flap.

4. In combination in a helicopter, a lifting rotor wing main body, a flap adjustably supported on said body forming a wing therewith, a rear spar in said body extending spanwise therein and vertically between the upper and lower walls thereof, said spar including a lower member and an upper member spaced therefrom, and a plurality of spanwise spaced vanes of streamline shape formed integrally with said lower member and located in said space between said upper and lower members forming a passage therebetween for directing a flow across the upper surface of said flap.

5. In combination, a wing main body, a flap adjustable about an axis on said body to form a wing therewith, a rear spar in said body extending spanwise between the upper and lower walls thereof, said spar including upper and lower spanwise members, and structural means joining said upper and lower members and spacing them apart to form therebetween a rearward directed slot adapted to discharge fluid across the upper surface of said flap, the lower surface defining said slot being substantially tangent to the upper wall of said flap for a range of adjustment of said flap about its axis.

6. In combination, a wing main body, a flap adjustable about an axis on said body to form a wing therewith, a rear spar in said body extending spanwise between the upper and lower walls thereof, said spar including lower and upper spanwise members, said lower members being in the form of a channel with its legs extending rearward forming a spanwise recess to accommodate the nose of said flap therein, the upper leg of said channel being substantially tangent to the upper wall of said flap for a range of adjustment of said flap about its axis.

7. In combination to form a wing, a wing upper wall and a wing lower wall, a spar extending vertically between said walls and spanwise within said wing, said spar including a lower member and an upper member spaced therefrom, said lower member having a web and a flange at the top thereof, and a plurality of vanes spaced spanwise and extending between said upper member and said flange spacing said members apart to form therebetween a rearward directed slot adapted to discharge fluid along the exterior surface of said wing.

EDWARD A. STALKER.

REFERENCES CITED

The following references are of record in the file of this patent:

UNITED STATES PATENTS

| Number | Name | Date |
| --- | --- | --- |
| 2,271,321 | Wagner et al. | Jan. 27, 1942 |
| 2,372,030 | Stalker | Mar. 20, 1945 |